US009955477B2

(12) United States Patent
Nigam et al.

(10) Patent No.: US 9,955,477 B2
(45) Date of Patent: Apr. 24, 2018

(54) METHOD AND APPARATUS FOR CONTROLLING CELL STATE AT SUBFRAME LEVEL IN WIRELESS NETWORK

(71) Applicant: Samsung Electronics Co., Ltd., Suwon-si, Gyeonggi-do (KR)

(72) Inventors: Anshuman Nigam, Bangalore (IN); Jung-Soo Jung, Seongnam-si (KR); Sun-Heui Ryoo, Yongin-si (KR); Jung-Min Moon, Suwon-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 14/700,975

(22) Filed: Apr. 30, 2015

(65) Prior Publication Data
US 2015/0319758 A1 Nov. 5, 2015

(30) Foreign Application Priority Data
May 1, 2014 (IN) .............................. 506/KOL/2014

(51) Int. Cl.
| | |
|---|---|
| *H04B 7/204* | (2006.01) |
| *H04W 72/04* | (2009.01) |
| *H04W 72/08* | (2009.01) |
| *H04L 5/00* | (2006.01) |
| *H04W 52/02* | (2009.01) |

(52) U.S. Cl.
CPC ...... *H04W 72/0446* (2013.01); *H04B 7/2048* (2013.01); *H04L 5/00* (2013.01); *H04W 72/085* (2013.01); *H04W 52/028* (2013.01)

(58) Field of Classification Search
CPC ............ H04L 5/0073; H04L 27/2691; H04W 52/028; H04B 7/2048
See application file for complete search history.

(56) References Cited

U.S. PATENT DOCUMENTS

| | | | |
|---|---|---|---|
| 2010/0303013 A1 | 12/2010 | Khandekar et al. | |
| 2013/0012186 A1* | 1/2013 | Kim ....................... | H04L 5/003 455/418 |
| 2015/0230286 A1* | 8/2015 | Feuersaenger .... | H04W 72/1215 370/252 |

OTHER PUBLICATIONS

R1-141441, "Small Cell on/off time reduction", Mar. 31-Apr. 4, 2014.*
3GPP TSG-RAN WG1 #76bis, R1-141441, "Small cell on/off time reduction" Mar. 31-Apr. 4, 2014.

* cited by examiner

*Primary Examiner* — Salvador E Rivas
(74) *Attorney, Agent, or Firm* — Jefferson IP Law, LLP (57) ABSTRACT

A method for controlling a cell state corresponding to whether to transmit a signal, on a subframe basis by an evolved Node B (eNB) in a wireless communication system is provided. The method includes determining a cell state of at least one subframe included in each of an N-th frame and an (N−1)-th frame, and at the start of the N-th frame, transmitting to a user equipment (UE), information about cell states of all subframes belonging to the N-th frame and information about cell states of all subframes belonging to the (N−1)-th frame.

20 Claims, 11 Drawing Sheets

METHOD AND APPARATUS FOR CONTROLLING CELL STATE AT SUBFRAME LEVEL IN WIRELESS NETWORK

CROSS-REFERENCE TO RELATED APPLICATION(S)

This application claims the benefit under 35 U.S.C. § 119(a) of an Indian patent application filed on May 1, 2014 in the Indian Patent Office and assigned Serial number 506/KOL/2014, the entire disclosure of which is hereby incorporated by reference.

TECHNICAL FIELD

The present disclosure relates to a method and apparatus for controlling a cell state at subframe level in a wireless network.

BACKGROUND

In a dense network, a large number of small cells are deployed in a planned or unplanned manner to meet the traffic demands of the existing mobile services. The small cells are deployed in addition to the umbrella macro cell that is primarily designed to provide coverage. The small cells are intended to provide data intensive services which cannot be provided to a satisfactory level by the existing networks. The existing networks already employ the deployment of small cells in hotspots to cater to the localized data surge. As per the 3rd generation partnership project (3GPP) long term evolution (LTE) networks, a number of small cells (e.g., ranging from 1 to 10) can be deployed per macro cell. However, multiple studies have concluded that the deployment of small cells per macro cell is not enough to meet the projected data needs of the future data intensive mobile services. Hence, a study is underway to increase the number of small cells that can be deployed under a macro cell in 3GPP release 12.

When a large number (e.g., >10) of small cells are deployed under a macrocell, simulations have shown that the small cells cause a large amount of interference among themselves, due to which the effective user data throughput does not scale in proportion to the number of small cells deployed. The reason that the effective user data throughput does not scale up is that a number of small cells are typically deployed in a cluster to serve a hotspot in the unplanned manner. Accordingly, a lot of effort is required to deploy the small cells in the planned manner. However, despite the effort for deploying the small cells in the planned manner, the effective user data throughput has not thus far increased enough.

The current research bodies are attempting to devise smarter interference mitigation schemes to address the interference problem among small cells. However, the interference mitigation schemes to address the interference problem cannot be used at a subframe level. It is because in a case where the small cells are connected to each other and the overlaid (umbrella) macro cell via the non-ideal backhaul, the delay is in the order of tens of milliseconds while the subframe in 3GPP LTE is 1 ms.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide specific schemes to switch a cell state in units of subframes to flexibly perform scheduling of an evolved node B (eNB).

Another aspect of the present disclosure is to provide a user equipment (UE) that may more accurately measure e.g., reference signals, based on the cell state of the eNB.

Another aspect of the present disclosure is to provide an eNB and UE that may reduce power consumption by turning them off for unnecessary time.

In accordance with an aspect of the present disclosure, a method for controlling a cell state corresponding to whether to transmit a signal, on a subframe basis by an eNB in a wireless communication system is provided. The method includes determining a cell state of at least one subframe included in each of an N-th frame and an (N−1)-th frame, and at the start of the N-th frame, transmitting to a (UE, information about cell states of all subframes belonging to the N-th frame and information about cell states of all subframes belonging to the (N−1)-th frame.

In accordance with another aspect of the present disclosure, a method for determining a cell state corresponding to whether an eNB transmits a signal, on a subframe basis by a UE in a wireless communication system is provided. The method includes receiving, as information about a cell state of a subframe, information about cell states of all subframes belonging to an N-th frame and information about cell states of all subframes belonging to an (N−1)-th frame, and determining the cell states of all subframes belonging to the N-th frame and the cell states of all subframes belonging to the (N−1)-th frame, by using the received information.

In accordance with another aspect of the present disclosure, an eNB for controlling a cell state corresponding to whether to transmit a signal, on a subframe basis in a wireless communication system is provided. The eNB includes a controller configured to determine a cell state of at least one subframe included in each of an N-th frame and an (N−1)-th frame, and a transceiver configured to, at the start of the N-th frame, transmit to a UE, information about cell states of all subframes belonging to the N-th frame and information about cell states of all subframes belonging to the (N−1)-th frame.

In accordance with another aspect of the present disclosure, a UE for determining a cell state corresponding to whether an eNB transmits a signal, on a subframe basis in a wireless communication system is provided. The UE includes a transceiver configured to receive, as information about a cell state of a subframe, information about cell states of all subframes belonging to an N-th frame and information about cell states of all subframes belonging to an (N−1)-th frame, and a controller configured to determine the cell states of all subframes belonging to the N-th frame and the cell states of all subframes belonging to the (N−1)-th frame, by using the received information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms, as will be mentioned later, are defined by taking functionalities of the present disclosure into account, but may vary depending on certain practices or intentions of users or operators. Accordingly, the definition of the terms should be made based on the descriptions throughout this specification.

The cell state corresponding to whether to transmit a signal may be switched to be ON or OFF at the subframe level. If the cell has no data to send to a user equipment (UE), it switches off completely. When the cell switches off, the cell does not transmit even the regular reference signals and synchronization signals that are to be transmitted in the normal cell state even though the cell has no data for any UE. In the case where the cell does not transmit even the regular reference signals and synchronization signals, the interference levels are considerably reduced. It is because the primary interference is created by the reference signals (e.g., cell-specific reference signals (CRS), channel state information reference signals (CSI RS), primary/secondary synchronization signals (PSS/SSS)).

However, the UE needs to be aware of the cell state (ON/OFF) for each subframe so that it may perform the measurements correctly. If the UE is unaware of the cell state it is connected to, it may perform measurements considering that all the cells are ON. This may impact the measurements for the received signal received power (RSRP), received signal strength indicator (RSSI), received signal received quality (RSRQ), etc. These measurement quantities typically involve averaging over multiple samples in order to obtain a realistic estimate as the wireless channel suffers from fast and slow channel fading.

In the 3rd generation partnership project (3GPP) long term evolution (LTE), a frame (or a radio frame) may be composed of 10 sub frames. Given the 3GPP LTE, a method for indicating the cell state of subframe level will now be described.

Figure 1:
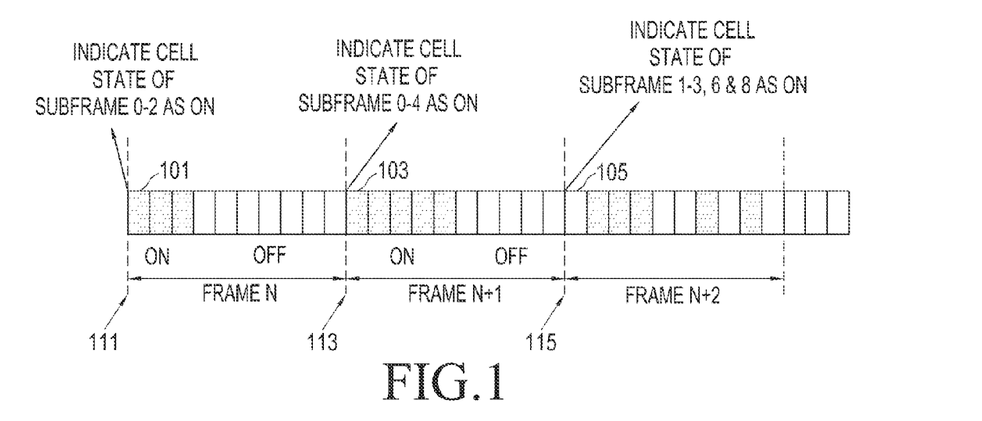
FIG. 1 illustrates a scheme in which an evolved node B (eNB) informs a user equipment (UE) of subframes in which the cell state is ON, among all subframes that belong to a frame, at the start of the frame according to an embodiment of the present disclosure.

FIG. 1 illustrates a scheme in which an evolved node B (eNB) informs a UE of subframes in which the cell state is ON, among all subframes that belong to a frame, at the start of the frame according to an embodiment of the present disclosure.

Referring to FIG. 1, the eNB may inform the UE of the cell state in all the 10 subframes at the start of a first subframe. Specifically, the eNB may inform the UE that the cell state is ON in subframes 0, 1, 2 of frame N, at the start 111 of the first subframe, i.e., subframe 0 101. The eNB may also inform the UE that the cell state is ON in subframes 0, 1, 2, 3, 4 of frame N+1, at the start 113 of the first subframe 103 of the frame N+1, and that the cell state is ON in subframes 1, 2, 3, 6, 8 of frame N+2, at the start 115 of the first subframe 105 of the frame N+2.

The UE thus needs to monitor the eNB from the start of the first subframe to obtain the information regarding the cell state. Based on the information, the UE may selectively monitor the eNB in the subframes in which the cell state is ON, or not monitor the eNB in the subframes in which the cell state is OFF. Furthermore, the UE may turn off its transceiver during the subframes in which the cell state is OFF. This may lead to significant improvements in the UE power consumption. The eNB may perform scheduling of all the subframes that belong to the frame, at the start of the frame.

Figure 2:
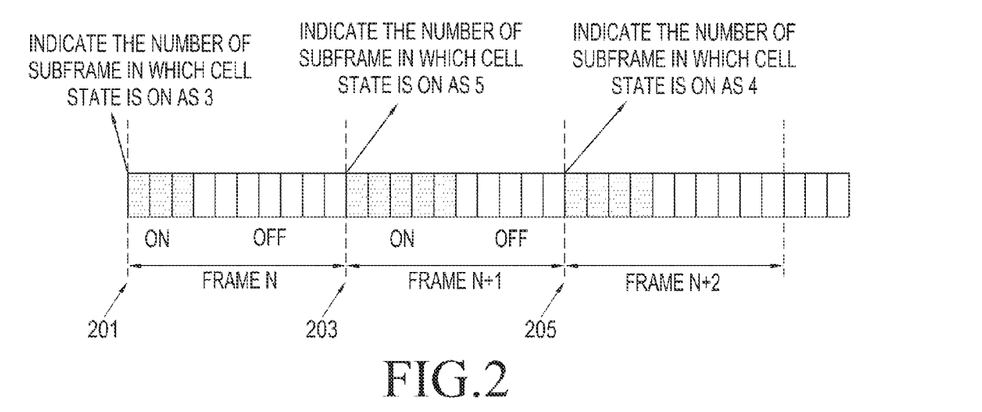
FIG. 2 illustrates a scheme in which an eNB informs a UE of the number of subframes in which the cell state is ON, among all subframes that belong to a frame, at the start of the frame according to an embodiment of the present disclosure.

FIG. 2 illustrates a scheme in which an eNB informs a UE of the number of subframes in which the cell state is ON, among all the subframes that belong to a frame, at the start of the frame according to an embodiment of the present disclosure.

Referring to FIG. 2, the eNB may inform the UE of how many subframes of the 10 subframes there are during which the cell state is ON, at the start of the first subframe. The subframes in which the cell state is ON is contiguous from the first subframe. The number of the subframes in which the cell state is ON may be as many contiguous subframes as are required for the total data transmission in the frame. Specifically, the eNB may inform the UE that the cell state is ON in 3 subframes of frame N, at the start 201 of the first subframe, i.e., subframe 0. The 3 subframes in which the cell state is ON need to be contiguous from the first subframe, and thus be subframes 0, 1, and 2. The eNB may also inform the UE that the cell state is ON in 5 subframes of frame N+1, at the start of the first subframe of the frame N+1 203, and that the cell state is ON in 4 subframes of frame N+2, at the start of the first subframe of the frame N+2 205. Similar to the scheme in FIG. 1, the eNB may perform scheduling of all the subframes that belong to the frame, at the start of the frame.

Referring to FIGS. 1 and 2, the eNB needs to perform the scheduling at a frame level instead of the subframe level. Accordingly, the scheduling of eNB is severely restricted. It may lead to 10 times the amount of degradation in the data latency. Since the small cells are primarily deployed to serve data intensive services for many users, this restriction in scheduling may impose a serious impact on the performance of the overall system. Especially, as shown in FIG. 2, since the subframes in which the cell state is ON need to be contiguous, the scheduling of the eNB is even more restricted.

Figure 3:
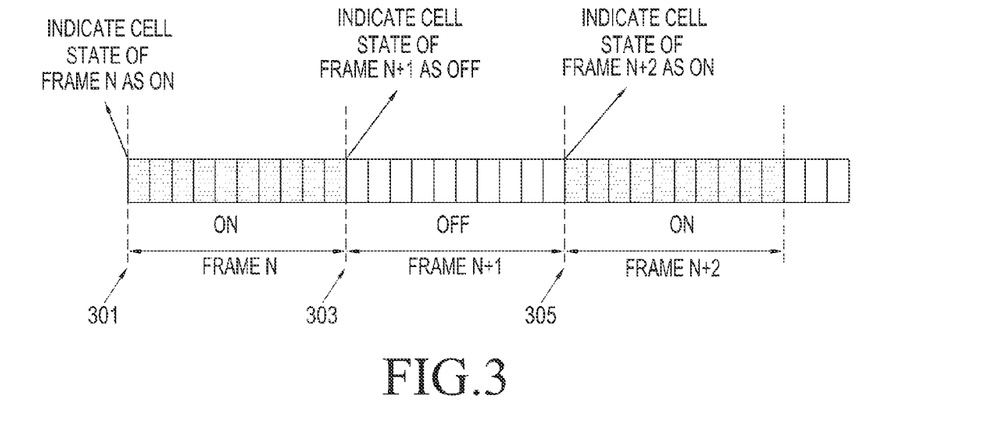
FIG. 3 illustrates a scheme in which an eNB informs a UE of a cell state in a frame, at the start of the frame according to an embodiment of the present disclosure.

FIG. 3 illustrates a scheme in which an eNB informs a UE of a cell state in a frame, at the start of the frame according to an embodiment of the present disclosure.

Referring to FIG. 3, the cell state is at a frame level rather than at subframe level. The eNB may inform the UE of whether the cell state is ON or OFF in all the subframes belonging to a frame, at the start of the frame. Specifically, the eNB may inform the UE that the cell state is ON in frame N, at the start of the first subframe, i.e., subframe 0 301. The eNB may also inform the UE that the cell state is OFF in frame N+1, at the start of the first subframe of the frame N+1 303, and that the cell state is ON in frame N+2, at the start of the first subframe of the frame N+2 305. Referring to FIG. 3, a scheme for switching the cell state at frame level simplifies the signaling but places further constraint on the scheduling of the eNB.

Figure 4:
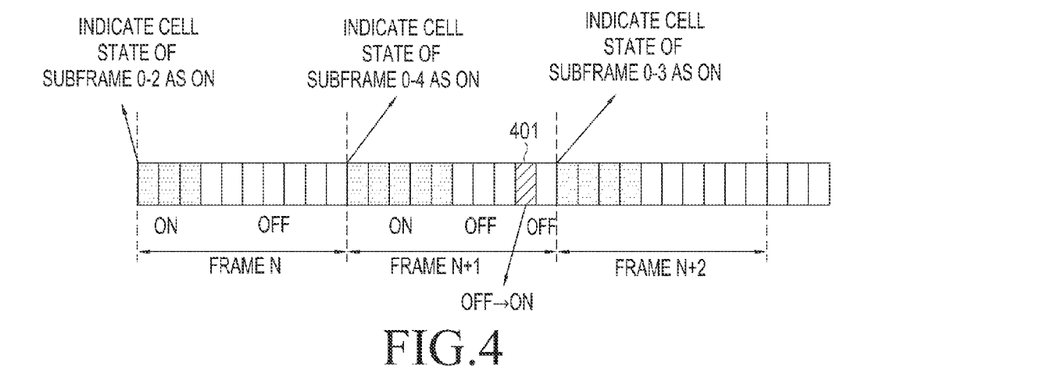
FIG. 4 illustrates a scheme for changing the cell state to be ON in some of subframes that were informed to a UE that the cell state was off according to an embodiment of the present disclosure.

FIG. 4 illustrates a scheme for changing the cell state to be ON in some of subframes that were informed to a UE that the cell state was off according to an embodiment of the present disclosure.

For example, referring to FIG. 1, in the scheme for informing the UE of subframes in which the cell state is ON, among all the subframes belonging to a frame, at the start of the frame, a problem arises when the eNB needs to change the cell state in some of the subframes (e.g., subframe 401) which were previously informed to UE that the cell state might be OFF, to be ON. Specifically, it corresponds to an occasion where there is a need to schedule a pre-Release 12 UE. The need exists because a release 12 UE will not be scheduled although an UE of legacy 3GPP LTE releases can be scheduled. This change of state from OFF to ON, which is performed by the eNB without informing the UE of the change, may affect the measurements of e.g., reference signals of the release 12 UEs. It is because these UEs will negate the measurements in the subframes in which the cell state has been switched to be ON. However, since the state of the subframe was switched to ON, the measurements are valid and thus should not be negated.

Figure 5:
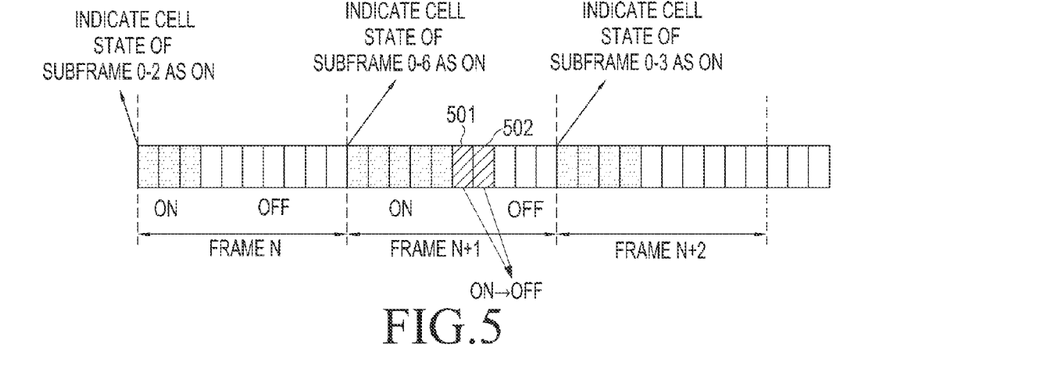
FIG. 5 illustrates the cell state while an eNB performs scheduling according to an embodiment of the present disclosure.

FIG. 5 illustrates the cell state while an eNB performs scheduling according to an embodiment of the present disclosure.

Referring to FIG. 5, the scheduling is performed by indicating more ON subframes than required by the eNB. The scheduling scheme is one of scheduling schemes proposed as an alternative to address the problem that the subframes which indicated the cell state as OFF need to switch the cell state to ON. The eNB may change the cell state to OFF in extra subframes (e.g., subframes 501 and 502) to reduce generation of interference. However, since the eNB has already informed the UE that the cell state is ON in these extra subframes, the UE measures e.g., reference signals considering that the cell state is ON. The measurements by the UE may reflect the wrong cell state, and thus not be correct. On the contrary if the eNB has not changed the cell state to OFF, more interference occurs, thereby degrading the performance of the entire system. Such scheduling may be performed in every frame or often.

Figure 6:
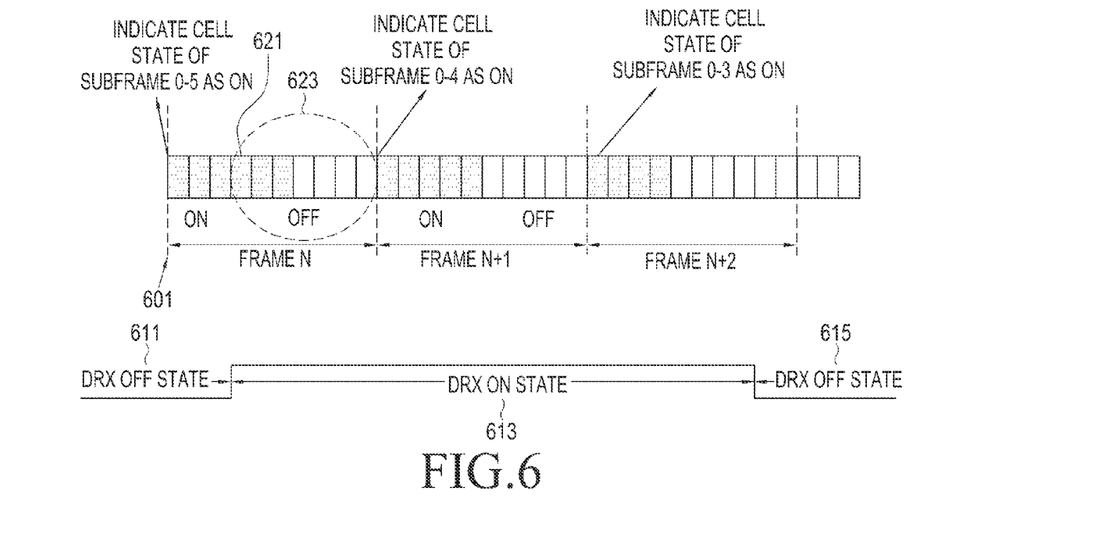
FIG. 6 illustrates the cell state in frames related to a UE provided with discontinuous reception (DRX) according to an embodiment of the present disclosure.

FIG. 6 illustrates the cell state in frames related to a UE provided with discontinuous reception (DRX) according to an embodiment of the present disclosure.

Referring to FIG. 6, to reduce power consumption of the UE, LTE, for example, may support the DRX. The UE may turn on an RX circuit for a period and observe signaling, which may be called a DRX ON state 613, and turn off the RX circuit for a period, which may be called DRX OFF states 611 and 615. DRX ON/OFF cycles may vary by settings in the UE. The ON period of the DRX may start at any subframe. Since the UE may turn on the RX circuit from a middle subframe of a frame, it may not be aware of the cell state in the frame in a case where the eNB employs a scheme as illustrated in FIG. 1, for example. Specifically, the eNB may inform the UE of the cell state in the subframes that belong to the frame N, at the start 601 of the frame N. However, since the UE is in DRX OFF state, it may not know the cell state. Afterward, if the UE switches into DRX ON state in subframe 3 621 of the frame N, the UE still may not know the cell state in the remaining subframes 623 of the frame N.

Hence, a method is required that may indicate the correct cell state for each subframe to the UE but not restrict the scheduling of the eNB.

Figure 7:
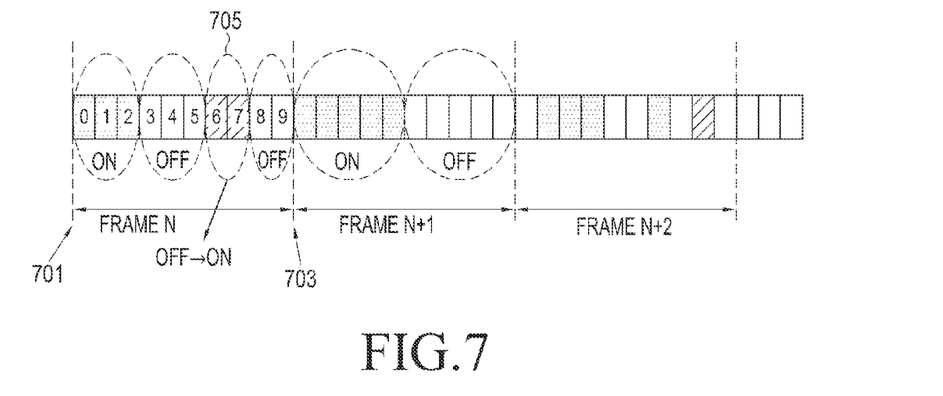
FIG. 7 illustrates a scheme in which an eNB informs a UE of a cell state in subframes that constitute a preceding frame of a current frame, at the start of the current frame according to an embodiment of the present disclosure.

FIG. 7 illustrates a scheme in which an eNB informs a UE of a cell state in subframes that constitute a preceding frame of a current frame, at the start of the current frame according to an embodiment of the present disclosure.

Referring to FIG. 7, in an embodiment of the present disclosure, the eNB may inform the UE of the correct cell state in all subframes of a preceding frame, as well as display the cell state in all subframes of a current frame, at the start of the frame. This may solve the problem that may arise when the eNB changes the cell state to be OFF in the subframes informed to the UE that the cell state was ON, at the start of the frame. This may also be applied when there is a need for scheduling of the pre-release 12 UE, as described above in connection with FIG. 4, e.g., when there is a need to send the pre-release 12 UE important control messages like handover messages. According to this embodiment, the UE may not need to monitor the cell in the subframes in which the cell state is changed, and thus save power.

Referring to FIG. 7, the eNB may inform the UE of the cell state in the subframes of frame N−1 and the cell state in the subframes of frame N, at the start 701 of the frame N. After that, the eNB may inform the UE of the cell state in the subframes of frame N and the cell state in the subframes of frame N+1, at the start 703 of the frame N+1. For example, the eNB informed the UE that the cell state would be ON in subframes 0, 1, 2 among all the subframes of the frame N and OFF in the other subframes 3 to 9, at the start of the frame N. However, in reality, the eNB changed the cell state to be ON in subframes 6, 7 of the frame N 705. Thus, the eNB may inform the UE of the cell state in all the subframes of the frame N, at the start of the frame N+1. Alternatively, the eNB may only inform the UE that the cell state is changed in subframes 6, 7 among all the subframes of the frame N, at the start of the frame N+1. In the latter case, the UE may make a decision based on what are informed at the start of the frame N. If the UE measures e.g., reference signals in the subframes 6, 7, it may determine that the measurements are valid.

The information sent to the UE by the eNB to inform the UE of the cell state in the subframes of the frame at the start of the frame may be represented with a frame level indicator (FLI). For example, the FLI may be represented in as many bits as the number of subframes that constitute the frame. Specifically, if the frame is comprised of 10 subframes, the FLI may be represented in 10 bits. Each bit corresponds to each subframe, and the bit value '0' or '1' may be set to indicate the cell state being ON or OFF, or the other way around. In another example, the FLI may represent the number of subframes in which the cell state is ON, as described above in connection with FIG. 2. The cell state may be ON in as many subframes as the number of subframes, sequentially from subframe 0. In yet another example, if the cell state is ON in as many subframes as an arbitrary number of subframes from a subframe, which is not subframe 0, the FLI may indicate number of the first subframe in which the cell state is ON and the number of subframes in which the cell state is ON.

The FLI may further include information about whether there is subframe(s) in which the cell state has changed from ON to OFF or from OFF to ON, and the number of subframes in which the cell state has changed. For example, the eNB may inform the UE that the cell state is ON in four subframes (e.g., subframes 0 to 3) belonging to a frame N, at the start of the frame N. However, if the cell state is ON even in subframe 4, the eNB may inform the UE that the cell state has changed to ON in one of the subframes of the frame N, at the start of frame N+1, with the FLI. Based on the information that the cell state has changed to ON and the number of subframes in which the cell state has changed is 1, the UE may determine that it is subframe 4 in which the cell state has changed. If the eNB informs the UE that there is a subframe or subframes in which the cell state has changed to OFF and the number of the subframe(s) is one, with the FLI, the UE may determine that it is subframe 3 in which the cell state has changed from ON to OFF. The subframe in which the cell state is changed may just be the last one of contiguous subframes.

Figure 8:
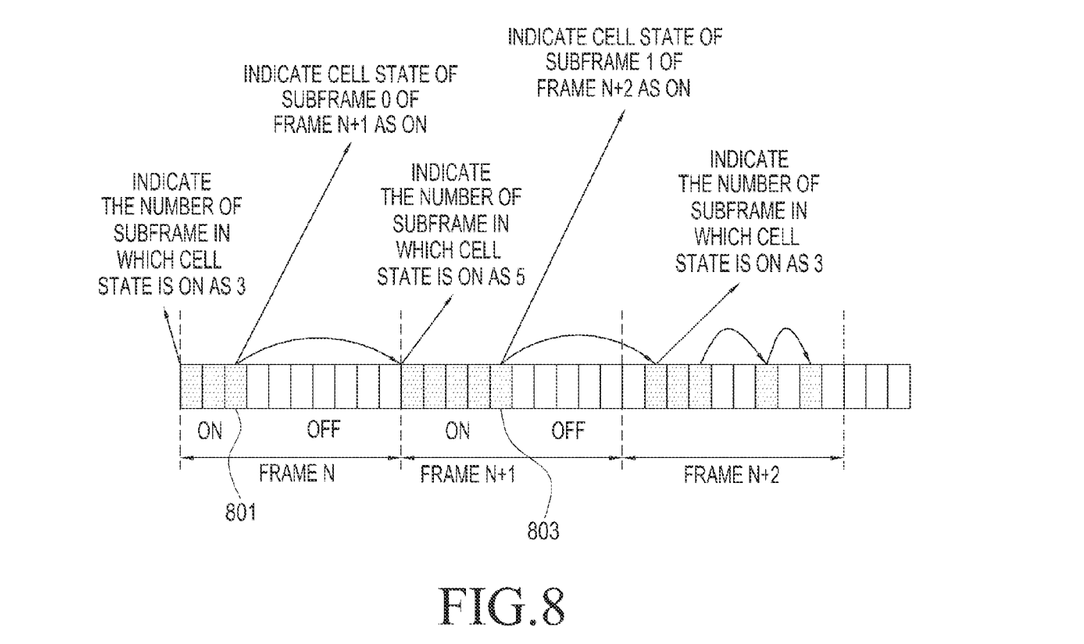
FIG. 8 illustrates a scheme in which an eNB informs a UE of a cell state using indication of contiguous subframes according to an embodiment of the present disclosure.

FIG. 8 illustrates a scheme in which an eNB informs a UE of a cell state using indication of contiguous subframes according to an embodiment of the present disclosure.

Referring to FIG. 8, in an embodiment of the present disclosure, a linked subframe indication (LSI) may be used to indicate the cell state in a set of one or more contiguous subframes. Specifically, the eNB may inform the UE of the number of the contiguous subframes in which the cell state is ON, during the first subframe of the contiguous subframes. After that, the eNB may inform the UE of a starting subframe of the next contiguous subframes in which the cell state is ON, during the last subframe (e.g., subframes 801 and 803) of the contiguous subframes, using the LSI. The number of the set of contiguous subframes in which the set of the cell is ON may be one. Further, the contiguous subframes may include one or more subframes.

Figure 9:
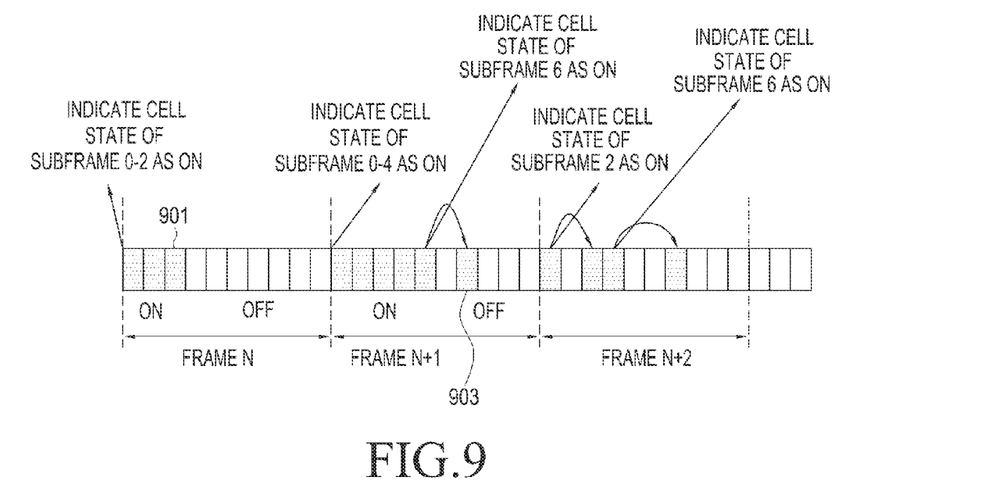
FIG. 9 illustrates a modification of the scheme of FIG. 8 according to an embodiment of the present disclosure.

FIG. 9 illustrates a modification of the scheme of FIG. 8 according to an embodiment of the present disclosure.

Referring to FIG. 9, in the modification of the scheme of FIG. 8, the eNB may always mark the cell state as ON in the first subframe of a frame. This implies that the last subframe (e.g., subframes 901 and 903) of the last contiguous set of subframes in the frame, in which the cell state is ON, does not need to indicate the starting subframe of the next set of contiguous ON subframes to the UE.

Figure 10:
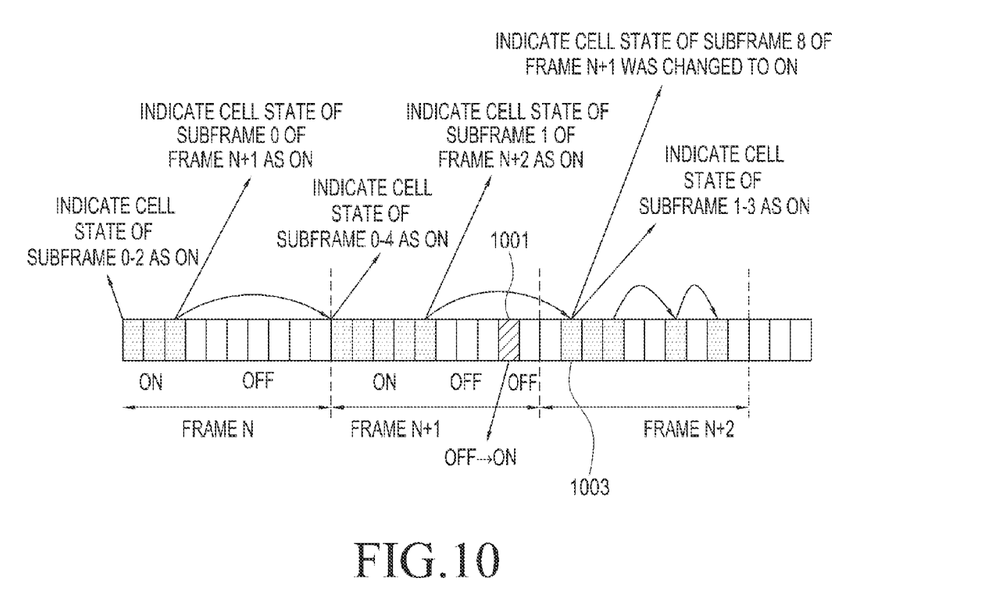
FIG. 10 illustrates a scheme in which an eNB informs a UE of numbers of contiguous subframes and whether there is a change in cell state in the preceding contiguous subframes, at a starting subframe of the contiguous subframes according to an embodiment of the present disclosure.

FIG. 10 illustrates a scheme in which an eNB informs a UE of numbers of contiguous subframes and whether there is a change in cell state in the preceding contiguous subframes, at a starting subframe of the contiguous subframes according to an embodiment of the present disclosure.

Referring to FIG. 10, in the embodiment of the present disclosure, the eNB may inform the UE of information regarding the contiguous subframes (e.g., subframe numbers, the number of subframes, etc.) and whether the cell state has changed in the preceding contiguous subframes in which the cell state is ON, during the starting subframe of the contiguous subframes in which the cell state is ON. The cell state has changed from OFF to ON in subframe 8 1001 of Frame N+1. The eNB may inform the UE of information about the contiguous subframe and the fact that the cell state has changed in subframe 8 1001, during the first subframe of the contiguous subframes in which the cell state is ON after subframe 8 1001. Furthermore, the eNB may inform the UE of a starting subframe 1003 of the next contiguous subframes in which the cell state is ON, during the last subframe of the contiguous subframes.

In addition, the eNB may inform the UE of information about subframes in which the set of the cell has changed, in the subframe in which the cell state has changed from OFF to ON. This substantially alleviates the scheduling restriction of eNB.

Figure 11:
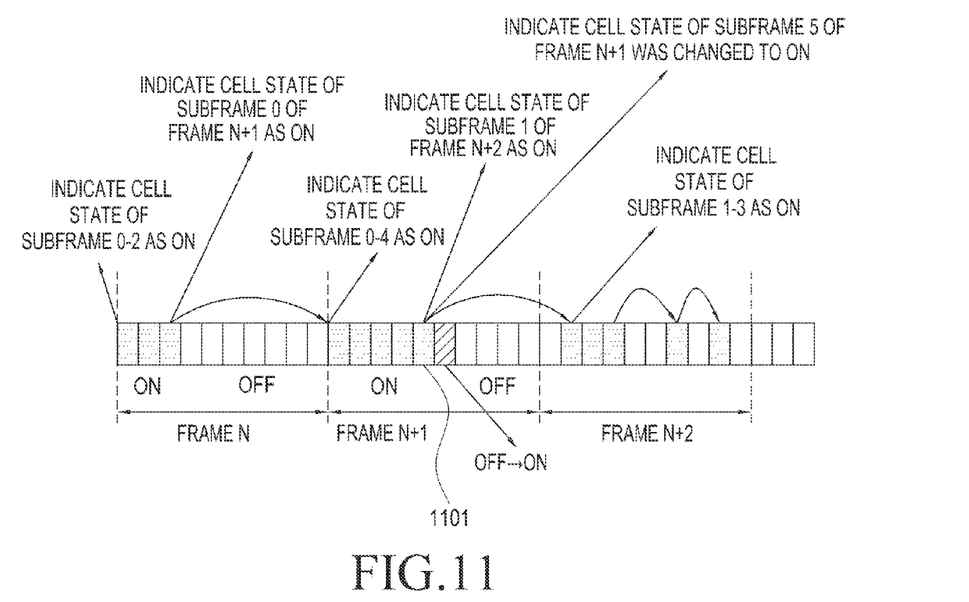
FIG. 11 illustrates another embodiment of the present disclosure.

FIG. 11 illustrates another embodiment of the present disclosure.

Referring to FIG. 11, in the embodiment of the present disclosure, the eNB may inform the UE of subframes in which the cell state has changed from OFF to ON, during the last subframe 1101 of the contiguous subframes in which the cell state is ON. This embodiment is useful when the eNB decides to change the cell state to ON in more subframes than the number of subframes previously determined due to increased traffic. Furthermore, the eNB may inform the UE of a starting subframe of the next contiguous subframes in which the cell state is ON, during the last subframe of the contiguous subframes.

Figure 12:
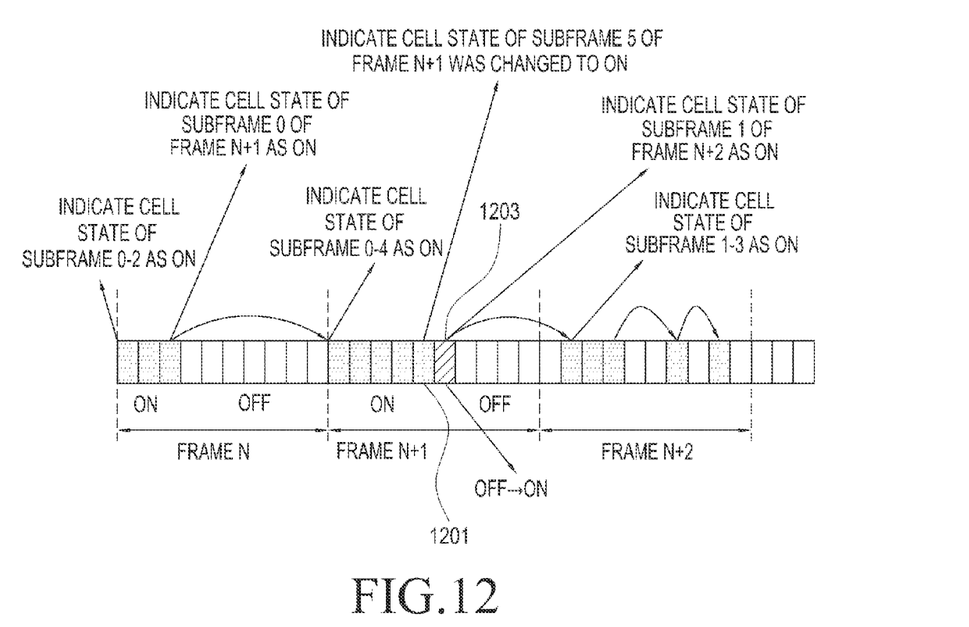
FIG. 12 illustrates a modification of the embodiment of FIG. 11 according to an embodiment of the present disclosure.

FIG. 12 illustrates a modification of the embodiment of FIG. 11 according to an embodiment of the present disclosure.

Referring to FIG. 12, in the modification of the embodiment of FIG. 11, the eNB may inform the UE of subframes in which the cell state has changed from OFF to ON, during the last subframe 1201 of the contiguous subframes in which the cell state is ON. However, the eNB may not inform the UE of a starting subframe of the next contiguous subframes in which the cell state is ON, during the last subframe of the contiguous subframes. Instead, the eNB may inform the UE of whether the cell state has changed in one or more subframes and a starting subframe of the next contiguous subframes in which the cell state is ON, during the subframe 1203 in which the cell state has changed. If the cell state has changed in the one or more subframes, the eNB may inform the UE of the change during the last subframe in which the cell state has changed, as well.

Figure 13:
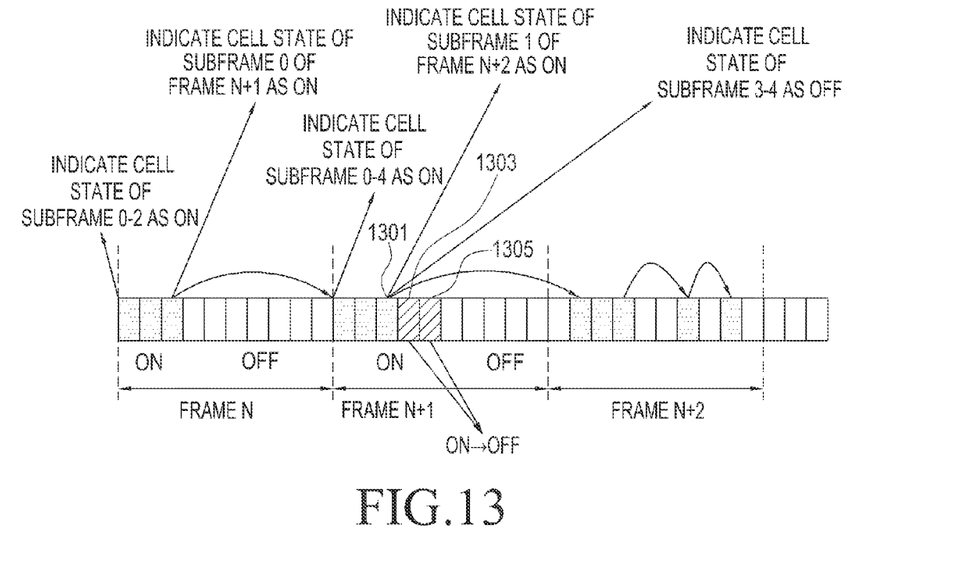
FIG. 13 illustrates another embodiment of the present disclosure.

FIG. 13 illustrates another embodiment of the present disclosure.

Referring to FIG. 13, in the embodiment of the present disclosure, the eNB may decide to change the cell state to OFF in some of the contiguous subframes in which the cell state is ON. In the subframe in which the cell state is changed to OFF (e.g., subframes 1303 and 1305), the eNB may inform the UE that the cell state has changed to OFF in the remaining subframes of the contiguous subframes. Specifically, the eNB may inform the UE that the cell state is ON in subframes 0 to 4 of frame N+1, at the start of the frame N+1. However, due to actual scheduling, the eNB decides to change the cell state to OFF in subframes 3 and 4, during subframe 2. Accordingly, the eNB may inform the UE that the cell state has changed to OFF in the subframes 3 and 4, during the subframe 2 1301. The embodiment may be useful for an eNB that intends to reduce the impact of over-scheduling.

Figure 14:
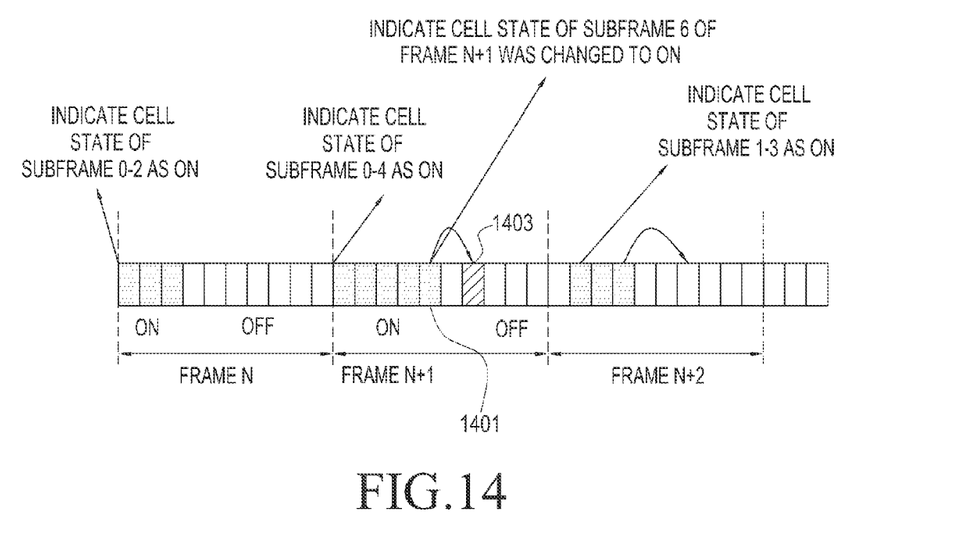
FIG. 14 illustrates another embodiment of the present disclosure.

FIG. 14 illustrates another embodiment of the present disclosure.

Referring to FIG. 14, in the embodiment of the present disclosure, FLI may indicate the subframe in the frame, in which the cell state is ON. If the cell state is additionally changed to ON in a subframe in which the cell state is OFF, or changed to OFF in a subframe indicated by the FLI that the cell state is ON, the eNB may inform the user of the change. Specifically, the eNB may inform the UE that the cell state is ON in subframes 0 to 4, using the FLI, at the start of frame N+1. After that, if the eNB decides to change the cell state to ON even in subframe 6 1403, it may inform the UE that the state of cell has changed to ON in the subframe 6 1403, during subframe 4 1401 among the subframes 0 to 4. This is useful to avoid the over scheduling by eNB at the start of the frame. Furthermore, in the embodiment of the present disclosure, the cell state may be changed to ON in more subframes, if needed.

Figure 15:
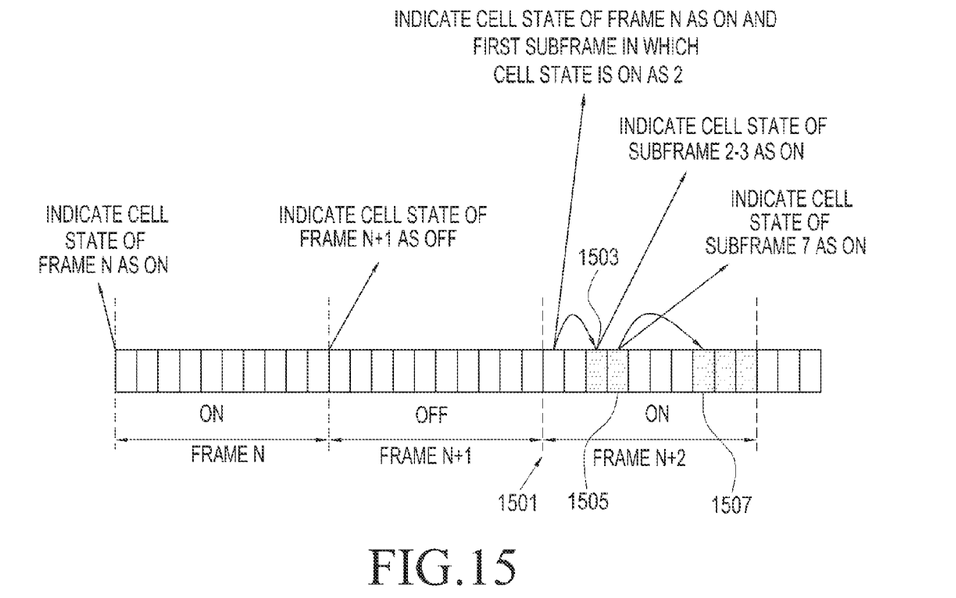
FIG. 15 illustrates another embodiment of the present disclosure.

FIG. 15 illustrates another embodiment of the present disclosure.

Referring to FIG. 15, in the embodiment of the present disclosure, similar to what are described in connection with FIG. 3, assume that the cell state is changed at frame level instead of subframe level. The eNB may inform the UE of the cell state of a frame with the FLI, at the start of the frame. If the eNB informs the UE that the cell state is ON with the FLI, at the start of the frame, LSI may be used in the frame. For example, the eNB may inform the UE that the cell state of the frame N+2 is ON, using the FLI, at the start 1501 of the frame N+2. Furthermore, the eNB may inform the UE that the cell state is ON in subframe 2 of the frame N+2 for the first time, using the FLI. Since that cell state being ON in the frame N+2 is informed to the UE using the FLI, the eNB may use the LSI. Specifically, the eNB may inform the UE that the cell state of subframes 2 1503 and 3 1505 of the frame N+2 is ON using the LSI. Furthermore, the eNB may inform the UE that the cell state is ON in subframes 3 1505 and 7 1507, using the LSI. To make it possible to use the LSI, the FLI needs to indicate that the cell state is ON in the frame.

Figure 16:
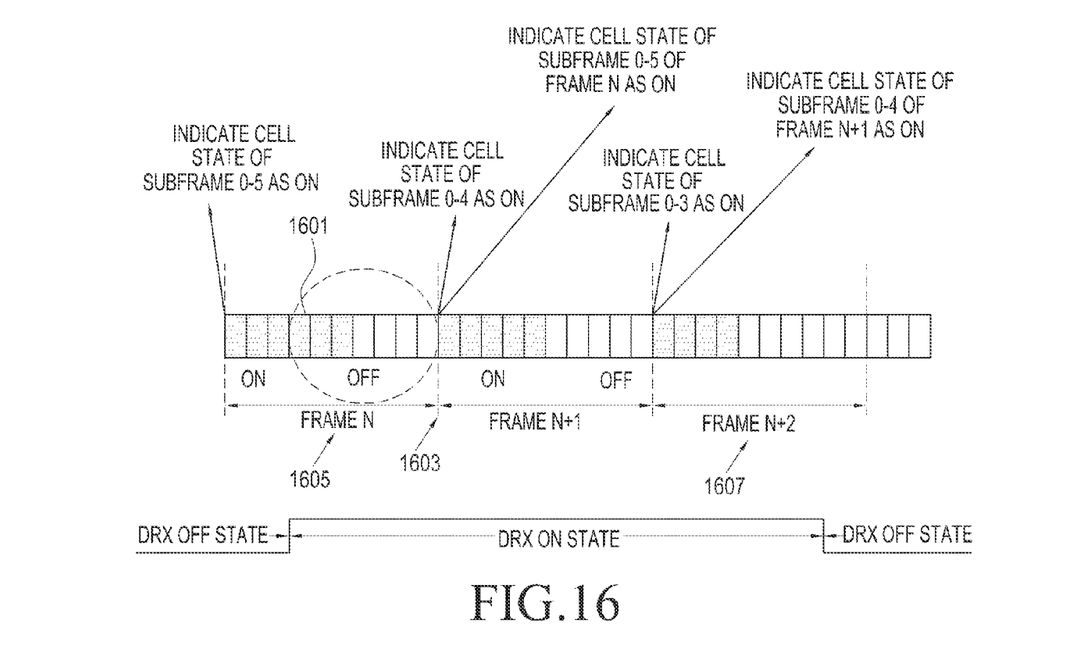
FIG. 16 illustrates another embodiment of the present disclosure.

FIG. 16 illustrates another embodiment of the present disclosure.

Referring to FIG. 16, in the embodiment of the present disclosure, as described above in connection with FIG. 6, the UE supported with the DRX may be turned ON by turning on the RX circuit in any subframe. At this time, the UE may not be aware of the cell state of the subframe. In the embodiment, assume that the cell state is ON in a frame 1605 to which the subframe 1601 belongs. At the start 1603 of a next frame to the frame 1605 having the subframe 1601, the eNB may inform the UE of the cell state of the frame having the subframe and the cell state of the next frame 1607, using the FLI. The UE may determine whether there is an error in the measurements obtained by measuring e.g., reference signals, based on the FLI.

In the existing network, only CRS measurement is required to measure the RSSI and RSRQ of the cells. In the dense network, however, a new discovery reference signal (DRS) is proposed that is transmitted infrequently by the eNB which is in dormant mode. An eNB that does not serve any UEs in connected mode may switch to dormant mode in which it only transmits DRS aperiodically for the purpose of enabling the UEs to discover the eNB. However the DRS pattern alone may not enable the UE to actually measure the RSSI and RSRQ. Because the UE will only measure the DRS of cells which are in dormant mode and will not be aware of the cells which are in normal mode. Furthermore, it is because the UE will not get a correct value of RSSI and thus obtain wrong RSRQ. On the contrary, a cell in normal mode may transmit both the CRS and the DRS.

Figure 17:
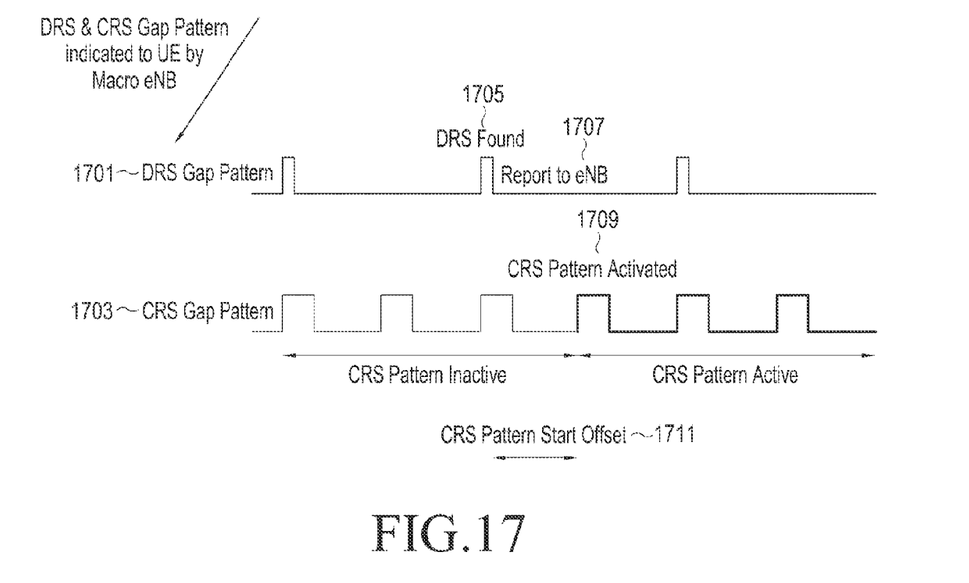
FIG. 17 illustrates another embodiment of the present disclosure.

FIG. 17 illustrates another embodiment of the present disclosure.

Referring to FIG. 17, to avoid the aforementioned issue, the eNB may configure two gap patterns for the UE in the embodiment of the present disclosure. One of the two gap patterns, a DRS gap pattern 1701 is to measure discovery reference signal (DRS) and the other, a CRS gap pattern 1703 is to measure CRS. Only the DRS gap pattern may be activated by default. Once the UE finds a DRS 1705 by using the DRS gap pattern 1701, it may report 1707 that to the macro eNB and activate 1709 the CRS gap pattern. Both the eNB and the UE needs to be aware of when the CRS gap pattern is activated. To give enough time for the UE to send the indication and for the eNB to process the indication, the CRS gap pattern may be allocated with at least an offset 1711 from the DRS ON period. In a modification of the embodiment, the eNB may assign a dedicated layer-1 signal like a ranging code for faster indication by the UE for informing that it has found the DRS and will be activating the CRS gap pattern at the configured offset.

Figure 18:
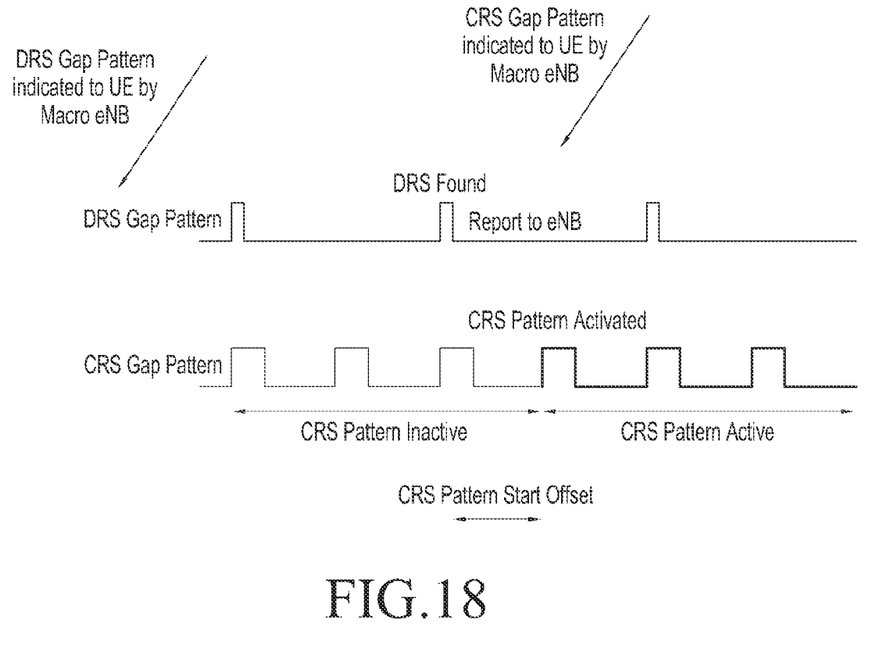
FIG. 18 illustrates an occasion where a UE is allocated a cell-specific reference signals (CRS) pattern, after reporting an eNB that the UE found discovery reference signal (DRS) according to an embodiment of the present disclosure.

FIG. 18 illustrates an occasion where a UE is allocated a CRS pattern, after reporting an eNB that the UE found DRS according to an embodiment of the present disclosure.

In the embodiment of the present disclosure, the eNB may indicate to the UE whether the cell is in dormant mode or normal mode by using a pair of DRSs. One of the pair of the DRSs may be used in the dormant mode and another used in the normal mode. The DRS used in the dormant mode may be chosen from a set of DRSs that are assigned to be used in dormant mode. The other DRS used in the normal mode may be chosen from the set of DRSs that is assigned to be used in normal mode. The sets of DRSs assigned to be used in the dormant mode and the normal mode may be different.

Figure 19:
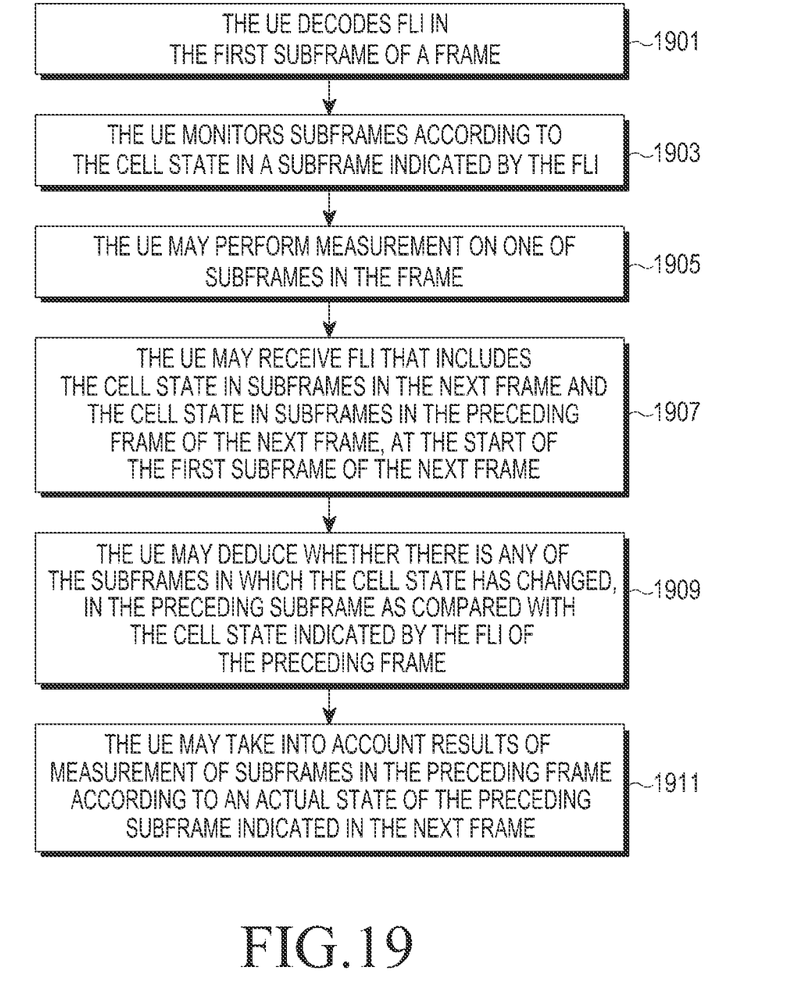
FIG. 19 is a flowchart illustrating an operation of UE according to an embodiment of the present disclosure.

FIG. 19 is a flowchart illustrating an operation of UE according to an embodiment of the present disclosure.

Referring to FIG. 19, in operation 1901, the UE decodes FLI in the first subframe of a frame.

In operation 1903, the UE monitors subframes according to the cell state in a subframe indicated by the FLI.

In operation 1905, the UE may perform measurement on one of the subframes in the frame.

In operation 1907, the UE may receive FLI that includes the cell state of subframes in the next frame and the cell state of subframes in the preceding frame of the next frame, at the start of the first subframe of the next frame.

In operation 1909, the UE may deduce whether there is any of the subframes in which the cell state has changed, in the preceding subframe as compared with the cell state indicated by the FLI of the preceding frame.

In operation 1911, the UE may take into account results of measurement of subframes in the preceding frame according to an actual state of the preceding subframe indicated in the next frame.

Figure 20:
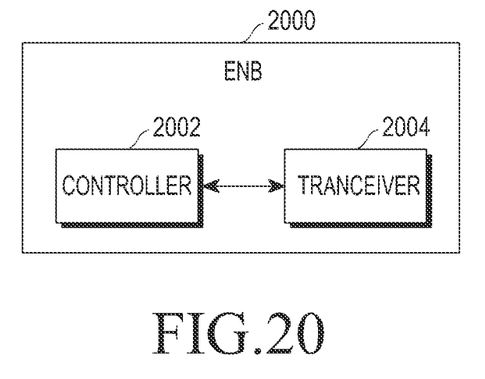
FIG. 20 is a block diagram of an eNB according to an embodiment of the present disclosure.

FIG. 20 is a block diagram of an eNB according to an embodiment of the present disclosure.

Referring to FIG. 20, the eNB 2000 may include a transceiver 2004 for sending or receiving signals, data, messages, FLI, LSI, etc., with an eNB or a UE, and a controller 2002 for controlling the transceiver 2004.

The controller 2002 may perform overall operations related to the cell state of the eNB of the aforementioned embodiments. Specifically, for example, the controller 2002 may switch the cell state between ON and OFF, and configure the FLI, the LSI, etc.

For convenience of understanding, while the transceiver 2004 and the controller 2002 are shown separately, they may be implemented together in a single unit.

Figure 21:
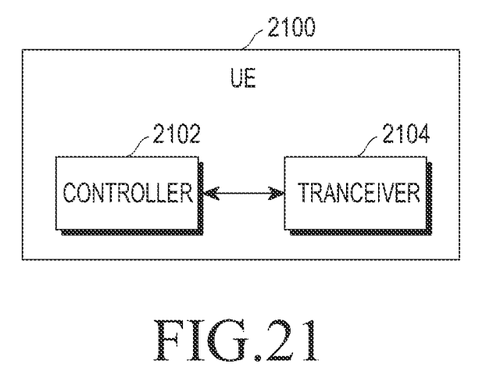
FIG. 21 is a block diagram of a UE according to an embodiment of the present disclosure.

FIG. 21 is a block diagram of a UE according to an embodiment of the present disclosure.

Referring to FIG. 21, the UE 2100 may include a transceiver 2104 for sending or receiving signals, data, messages, FLI, LSI, etc., with an eNB or another UE, and a controller 2102 for controlling the transceiver 2104.

The controller 2102 may perform overall operation related to determining e.g., whether measurements of e.g., reference signals of the UE is valid. Specifically, for example, the controller 2102 may determine whether e.g., the reference signals measured in the subframes are valid by determining the cell state from the received FLI, the LSI.

For convenience of understanding, while the transceiver 2104 and the controller 2102 are shown separately, they may be implemented together in a single unit.

It is noted that the illustrations of schemes for controlling the cell state at subframe level, block diagrams of the apparatus shown in FIGS. 1 to 21 are only examples and not intended to limit the scope of the present disclosure. In this respect, all the components or operations illustrated in FIGS. 1 to 21 should not be interpreted as essential elements to implement the present disclosure, and more or fewer of them may be used to implement the present disclosure within the scope of the present disclosure.

The foregoing operations may be implemented by program codes stored in a storage equipped in the entity, function, eNB, or UE. In other words, the controller of the entity, function, eNB, or UE may perform the foregoing operations by reading out and executing the program codes with a processor or the central processing unit (CPU).

Various components and modules of the entity, function, eNB, or UE as described in the present disclosure may be implemented in hardware, such as complementary metal oxide semiconductor (CMOS)-based logic circuits, firmware, software, or a combination thereof. For example, various electronic structures and methods may be practiced using electrical circuits, such as transistors, logic gates, and application-specific integrated circuits (ASICs).

According to various embodiments of the present disclosure, an eNB may flexibly perform scheduling by switching a cell state at subframe level.

A UE may more accurately measure, e.g., reference signals, based on the cell state of the eNB.

Furthermore, the eNB and UE may reduce power consumption by turning off their power for unnecessary period of time.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for signal transmission by an evolved node B (eNB) in a wireless communication system, the method comprising:
    determining at least one cell state on the signal transmission of at least one subframe included in each of an N-th frame and an (N+1)-th frame; and
    transmitting, to a user equipment (UE), the N-th frame and the (N+1)-th frame in order,
    wherein a first subframe of the (N+1)-th frame comprises information on the at least one cell state, and
    wherein the information on the at least one cell state comprises first information on at least one cell state of at least one subframe included in N-th frame and second information on at least one cell state of at least one subframe included in the (N+1)-th frame.

2. The method of claim 1, wherein the first information indicates whether at least one cell state of at least one subframe included in the N-th frame is changed.

3. The method of claim 1, wherein one of the at least one cell state on the signal transmission corresponds to on-state or off-state.

4. The method of claim 3, wherein a subframe corresponding to the on-state is monitored and a subframe corresponding to the off-state is not monitored.

5. The method of claim 1, wherein the information on the at least one cell state is represented with a frame level indicator (FLI).

6. A method for signal transmission by a user equipment (UE) in a wireless communication system, the method comprising:
  receiving, from an evolved node B (eNB), a first subframe of the (N+1)-th frame comprising information on at least one cell state on the signal transmission of at least one subframe included in each of an N-th frame and an (N+1)-th frame; and
  monitoring the at least one cell based the information on the at least one cell state,
  wherein the information on the at least one cell state comprises first information on at least one cell state of at least one subframe included in N-th frame and second information on at least one cell state of at least one subframe included in the (N+1)-th frame.

7. The method of claim 6, wherein the first information indicates whether at least one cell state of at least one subframe included in the N-th frame is changed.

8. The method of claim 6, wherein one of the at least one cell state on the signal transmission corresponds to on-state or off-state.

9. The method of claim 8, wherein a subframe corresponding to the on-state is monitored and a subframe corresponding to the off-state is not monitored.

10. The method of claim 6, wherein the information on the at least one cell state is represented with a frame level indicator (FLI).

11. An evolved node B (eNB) for signal transmission in a wireless communication system, the eNB comprising:
  a processor configured to determine at least one cell state on the signal transmission of at least one subframe included in each of an N-th frame and an (N+1)-th frame; and
  a transceiver configured to transmit to a user equipment (UE), the N-th frame and the (N+1)-th frame in order, wherein a first subframe of the (N+1)-th frame comprises information on the at least one cell state, and
  wherein the information on the at least one cell state comprises first information on at least one cell state of at least one subframe included in N-th frame and second information on at least one cell state of at least one subframe included in the (N+1)-th frame.

12. The eNB of claim 11, wherein the first information indicates whether at least one cell state of at least one subframe included in the N-th frame is changed.

13. The eNB of claim 11, wherein one of the at least one cell state on the signal transmission corresponds to on-state or off-state.

14. The eNB of claim 13, wherein a subframe corresponding to the on-state is monitored and a subframe corresponding to the off-state is not monitored.

15. The eNB of claim 11, wherein the information on the at least one cell state is represented with a frame level indicator (FLI).

16. A user equipment (UE) for signal transmission in a wireless communication system, the UE comprising:
  a transceiver configured to receive, from an evolved node B (eNB), a first subframe of the (N+1)-th frame comprising information on at least one cell state on the signal transmission of at least one subframe included in each of an N-th frame and an (N+1)-th frame; and
  a controller configured to monitor the at least one cell based the information on the at least one cell state,
  wherein the information on the at least one cell state comprises first information on at least one cell state of at least one subframe included in N-th frame and second information on at least one cell state of at least one subframe included in the (N+1)-th frame.

17. The UE of claim 16, wherein the first information indicates whether at least one cell state of at least one subframe included in the N-th frame is changed.

18. The UE of claim 16, wherein one of the at least one cell state on the signal transmission corresponds to on-state or off-state.

19. The UE of claim 18, wherein a subframe corresponding to the on-state is monitored and a subframe corresponding to the off-state is not monitored.

20. The UE of claim 16, wherein the information on the at least one cell state is represented with a frame level indicator (FLI).

* * * * *